United States Patent [19]

Inoue et al.

[11] Patent Number: 5,046,108

[45] Date of Patent: Sep. 3, 1991

[54] IMAGING PROCESSING METHOD AND APPARATUS SUITABLY USED FOR OBTAINING SHADING IMAGE

[75] Inventors: Yoichi Inoue, Tokyo; Akira Kasano, Kokubunji, both of Japan

[73] Assignee: Kabushiki Kaisha Toshiba, Kawasaki, Japan

[21] Appl. No.: 262,639

[22] Filed: Oct. 26, 1988

[30] Foreign Application Priority Data

Oct. 31, 1987 [JP] Japan .................. 62-276014
Oct. 31, 1987 [JP] Japan .................. 62-276015

[51] Int. Cl.[5] .................. G06K 9/00; G06F 15/00; H01J 15/00
[52] U.S. Cl. .................. 382/6; 364/522; 378/901
[58] Field of Search .................. 364/522, 518; 340/729; 378/901; 382/6

[56] References Cited

U.S. PATENT DOCUMENTS

| | | | |
|---|---|---|---|
| 3,621,214 | 11/1971 | Romney et al. | 364/522 |
| 4,737,921 | 4/1988 | Goldwasser et al. | 364/522 |
| 4,862,391 | 8/1989 | Ohhashi | 340/729 |
| 4,901,064 | 2/1990 | Deering | 364/522 |

OTHER PUBLICATIONS

Lih-Shyang Chen et al., "Surface Shading in the Cuberille Environment", IEEE Computer Graphics and Applications, Dec. 1985, pp. 33-43.

Primary Examiner—David K. Moore
Assistant Examiner—Michael R. Cammarata
Attorney, Agent, or Firm—Finnegan, Henderson, Farabow, Garrett and Dunner

[57] ABSTRACT

An image processing apparatus for obtaining a shading image from a plurality of two-dimensional tomogram images includes a first obtaining section for obtaining a plurality of distance gradation images from the plurality of two-dimensional tomogram images and a second obtaining section for obtaining a distance image having density data is selected from the distance gradation image density data in units of pixels in gradation. The distance image has density data representing, in gradation, distances from a pre-designated area on a pre-designated plane to an object in gradation. The image processing apparatus further includes a third obtaining section for obtaining a normal image having as density data normal vector components of the object from the distance image, and a fourth obtaining section for obtaining the shading image having as density data luminance data obtained from the density data of the normal image and direction data representing a designated direction from when the object is viewed.

21 Claims, 10 Drawing Sheets

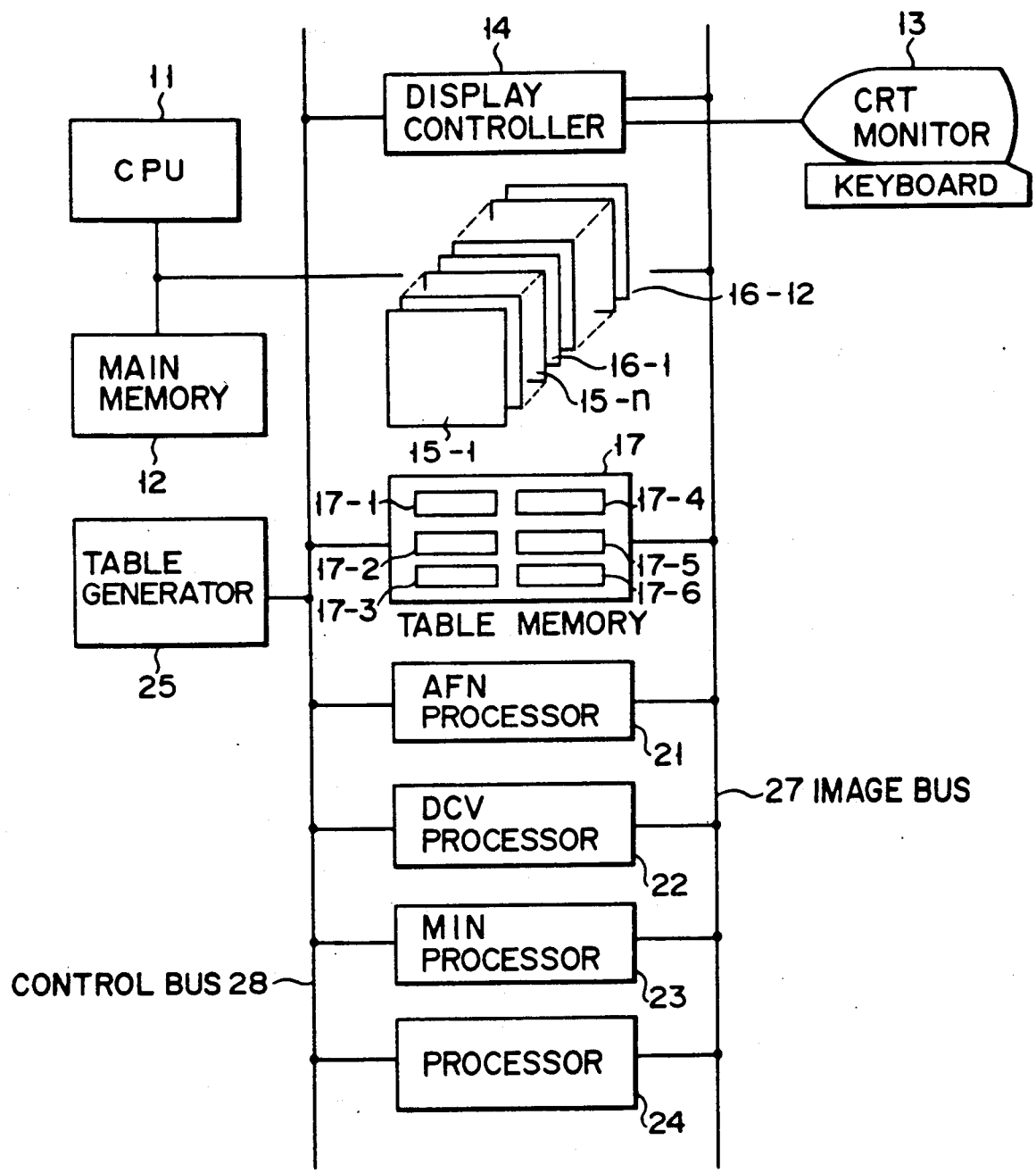
F I G. 1

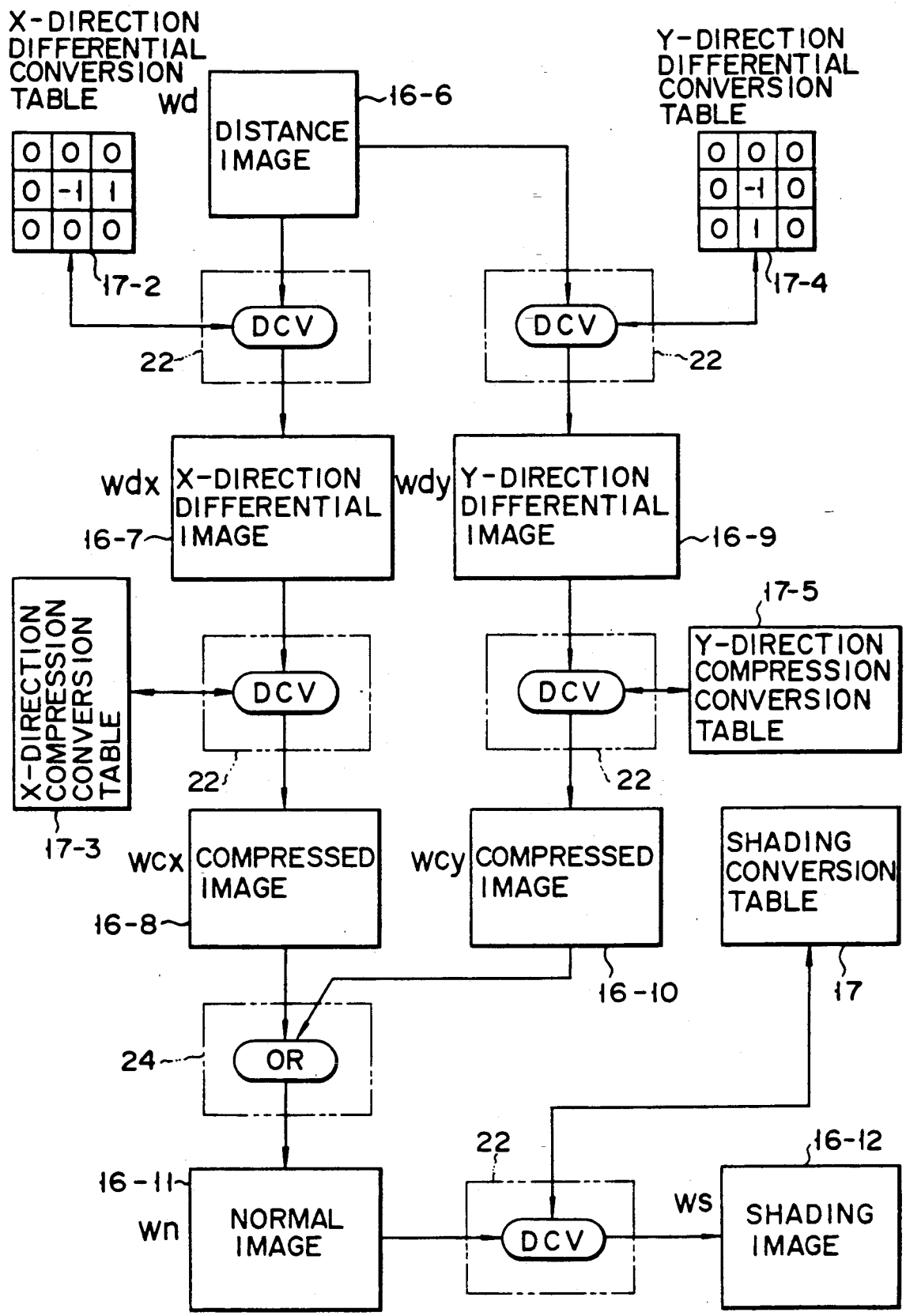
F I G. 4B

```
       (12 BITS)
   ┌─────────────┐
   4BITS wip  8BITS wif     TABLE 17-1
                            DENSITY DATA
      0          0             255
      0          1             255
      ¦          ¦              ¦
      0         255            255
      1          0              0
      ¦          1              1
      ¦          2              2
      ¦          3              3
      ¦          ¦              ¦
      1         255            255
```

| 0 | 0 | 0 |
|---|---|---|
| 0 | -1 | 1 |
| 0 | 0 | 0 |

| 0 | 0 | 0 |
|---|---|---|
| 0 | -1 | 0 |
| 0 | 1 | 0 |

| ADDRESS | X-DIRECTION COMPRESSION DATA |
|---|---|
| 0000 0000 | 0000 0000 |
| 0000 0001 | 0000 0000 |
| ⋮ | ⋮ |
| 0000 1111 | 0000 0000 |
| 0001 0000 | 0000 0001 |
| ⋮ | ⋮ |
| 1111 1111 | 0000 1111 |

(256)

| ADDRESS | Y-DIRECTION COMPRESSION DATA |
|---|---|
| 0000 0000 | 0000 0000 |
| ⋮ | ⋮ |
| 0000 1111 | 0000 0000 |
| 0001 0000 | 0001 0000 |
| ⋮ | ⋮ |
| 1111 1111 | 1111 0000 |

(256)

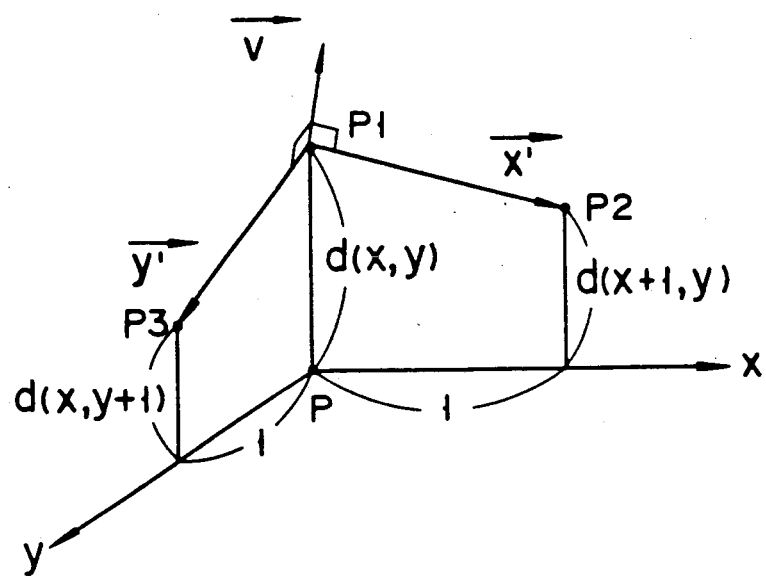
FIG. 13
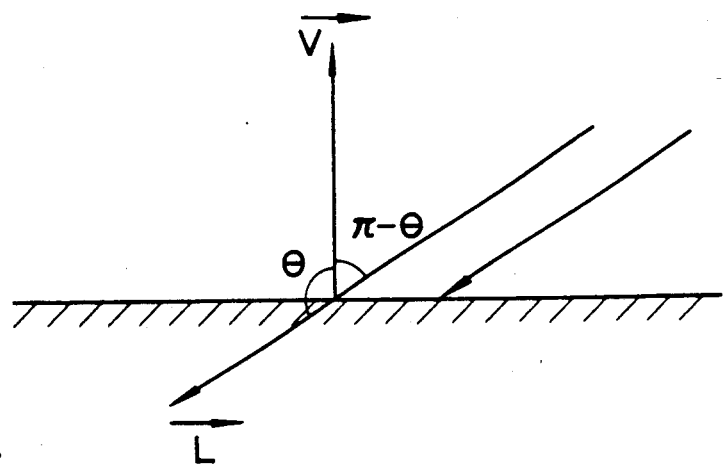
FIG. 14
| -1 | 0 | 1 |
|----|---|---|
| -2 | 0 | 2 |
| -1 | 0 | 1 |
FIG. 15A
| -1 | -2 | -1 |
|----|----|----|
| 0  | 0  | 0  |
| 1  | 2  | 1  |
FIG. 16A
| -1 | 0 | 1 |
|----|---|---|
| -1 | 0 | 1 |
| -1 | 0 | 1 |
FIG. 15B
| -1 | -1 | -1 |
|----|----|----|
| 0  | 0  | 0  |
| 1  | 1  | 1  |
FIG. 16B

IMAGING PROCESSING METHOD AND APPARATUS SUITABLY USED FOR OBTAINING SHADING IMAGE

BACKGROUND OF THE INVENTION

1. Field of the Invention

The present invention relates to an image processing method and apparatus suitably used for obtaining a distance image from a series of tomogram images when a three-dimensional binary image of an object is viewed from an arbitrary direction, obtaining a normal image from the obtained distance image, and obtaining a shading image of the object from the obtained normal image.

2. Description of the Related Art

Recently, it has been attempted to form a three-dimensional binary image of an object from a series of two-dimensional tomogram images obtained by a CT scanner or the like. In order to stereoscopically display the shape of a three-dimensional binary image of an object when viewed from an arbitrary direction by shading, a distance image from an observing point must be obtained. A distance image is obtained as density data which represents distances from the respective points of a desired plane including an observing point, i.e., points corresponding to the respective pixels in an area corresponding to one screen defined within the plane, to the surfaces of corresponding portions of an object represented by a three-dimensional binary image. However, since the data size of a three-dimensional image becomes large and hence large-scale processing is required as compared with a two-dimensional image, a long period of time is required to obtain a single distance image.

According to another method, a normal image is obtained from a distance image, and a so-called shading image is obtained by calculating the luminance of a surface of an object when a light beam is radiated onto the object from an arbitrary direction on the basis of the obtained normal image. However, the amount of luminance calculation required by this method enormous, and hence a long period of time is required to obtain a single shading image.

SUMMARY OF THE INVENTION

The present invention has been made in consideration of the above situation, and has as its object to provide an image processing method and apparatus capable of easily obtaining a distance image of a three-dimensional binary image when viewed from an arbitrary direction at high speed by gradation processing of a two-dimensional image, and obtaining a normal image from the obtained distance image, and further obtaining a shading image.

According to the present invention, there is provided an image processing apparatus for obtaining a shading image from a plurality of two-dimensional tomogram images, comprising a first obtaining section for projecting each of the two-dimensional tomogram images onto a pre-designated area to obtain a plurality of projection images, and obtaining a plurality of distance gradation images, each having gradation data representing a distance from each of the two-dimensional tomogram images to a corresponding one of the projection images in gradation as density data for each distance gradation pixel, and a second obtaining section for obtaining the distance image having gradation data as density data, which is selected from the gradation data of corresponding distance gradation pixels in units of the corresponding distance gradation pixels in the distance gradation images in accordance with gradation. Each distance pixel in the distance image has gradation data as density data, which represents a distance from a given point in a pre-designated area on a pre-designated plane to a corresponding point of the object. The image processing apparatus further comprises a third obtaining section for obtaining, from the distance image, a normal image having a normal vector component of the corresponding point of the object as density data of a corresponding distance pixel, and a forth obtaining section for obtaining luminance data for each pixel from the density data of the normal image and the direction data representing the designated direction, and obtaining a shading image having the obtained luminance data as density data.

According to the present invention, there is provided an image processing method of obtaining a distance image from a plurality of two-dimensional tomogram images, each distance pixel of the distance image having gradation data representing a distance from a given point in a pre-designated area on a pre-designated plane to a corresponding point of an object in gradation as density data, comprising the steps of projecting each of the two-dimensional tomogram images onto the predesignated designated area to obtain a plurality of projection images, and obtaining a plurality of distance gradation images each having gradation data representing a distance from each of the two-dimensional tomogram images to a corresponding one of the projection images as density data for each distance gradation pixel, and obtaining the distance image having gradation data as density data, which is selected from the gradation data of corresponding distance gradation pixels in units of the corresponding distance gradation pixels in the distance gradation images in accordance with gradation.

As described above, according to the present invention, since processing of obtaining, from a series of tomogram images, a distance image of a three-dimensional binary image of an object when viewed from an arbitrary direction, a normal image, and a shading image can be performed using two-dimensional gradation image, a two-dimensional image processor can be used for this image processing. Therefore, the processing speed can be increased.

BRIEF DESCRIPTION OF THE DRAWINGS

FIG. 1 is a block diagram showing an arrangement of an image processing apparatus according to an embodiment of the present invention;

FIGS. 4A and 4B are views for explaining the operation shown in FIGS. 3A and 3B;

FIG. 13 is a view showing a normal vector;

FIG. 14 is a view for explaining diffusion reflection of parallel light beams on a plane;

FIGS. 15A and 15B are views showing an x-direction differential conversion table which can be used in place of the x-direction differential conversion table in FIG. 10; and FIGS. 16A and 16B are views showing a y-direction differential conversion table which can be used in place of the y-direction differential conversion table in FIG. 11.

DETAILED DESCRIPTION OF THE PREFERRED EMBODIMENT

Figure 2:
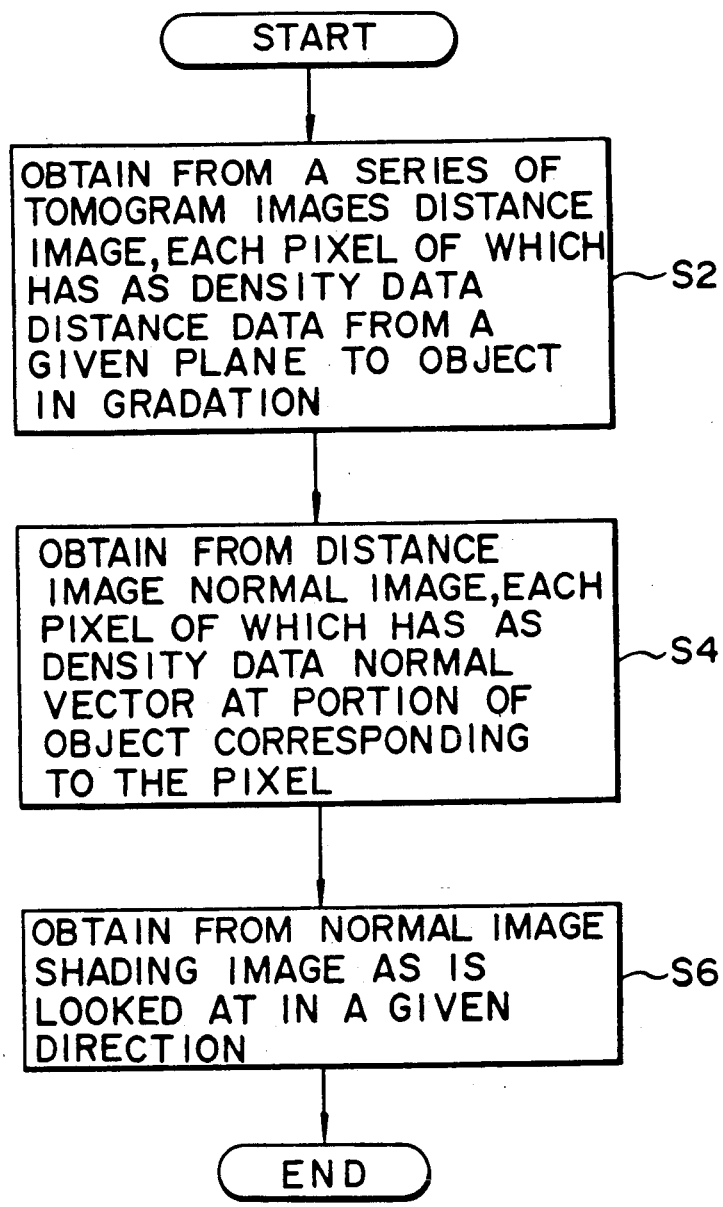
FIG. 2 is a flow chart for explaining an overall operation of the embodiment.

An image processing apparatus according to an embodiment of the present invention will be described in detail below with reference to the accompanying drawings.

An arrangement of the embodiment will be described first with reference to FIG. 1. Referring to FIG. 1, CPU 11 controls an operation of the overall apparatus. Main memory 12 stores data and instructions required for image processing. CPU 11 and memory 12 are connected to control bus 28. CRT monitor 13 with a keyboard displays images and the like. Display controller 14 is connected to control bus 28, image bus 27, and CRT monitor 13. Display controller 14 causes monitor 13 to display an image in accordance with a display control instruction from CPU 11. Each of $512 \times 512$-bit two-dimensional frame memories 15-1 to 15-n, and 16-1 to 16-12 stores image data having 8-bit density.

Conversion table 17 is connected to buses 27 and 28. Conversion table 17 includes distance gradation conversion table 17-1 for obtaining distance gradation data, x-direction differential conversion table 17-2 for obtaining x-direction differential data, x-direction compression conversion table 17-3 for compressing x-direction differential data, y-direction differential conversion table 17-4 for obtaining y-direction differential data, y-direction compression conversion table 17-5 for compressing y-direction differential data, and shading conversion table 17-6 for obtaining a shading image.

Affine transformation (AFN) processor 21 is connected to buses 27 and 28. In response to an affine transformation instruction from CPU 11, AFN processor 21 comprising a two-dimensional image processor performs affine transformation of designated images of tomogram images stored in frame memories 15-1 to 15-n and a gray scale image stored in frame memory 16-2 and stores the obtained images in designated frame memory 16-1 or 16-3. Data conversion (DCV) processor 22 is connected to buses 27 and 28. In response to a data conversion instruction from CPU 11, DCV processor 22 converts an image stored in one of the frame memories into density data by referring to one of the conversion tables stored in table memory 17.

Minimum value operating (MIN) processor 23 selects smaller data of the density data of corresponding pixels of both images stored in two frame memories 16-1 and 16-5, and stores the selected data at a corresponding pixel position in frame memory 16-6 as density data. Processor 24 is connected to buses 27 and 28, and performs an arithmetic operation of density data of each pixel in an image stored in a frame memory in accordance with an arithmetic operation instruction from CPU 11. Table generator 25 is connected to control bus 28. In accordance with a table generation instruction from CPU 11, table generator 25 generates a table and stores it in table memory 17.

Figure 3A:
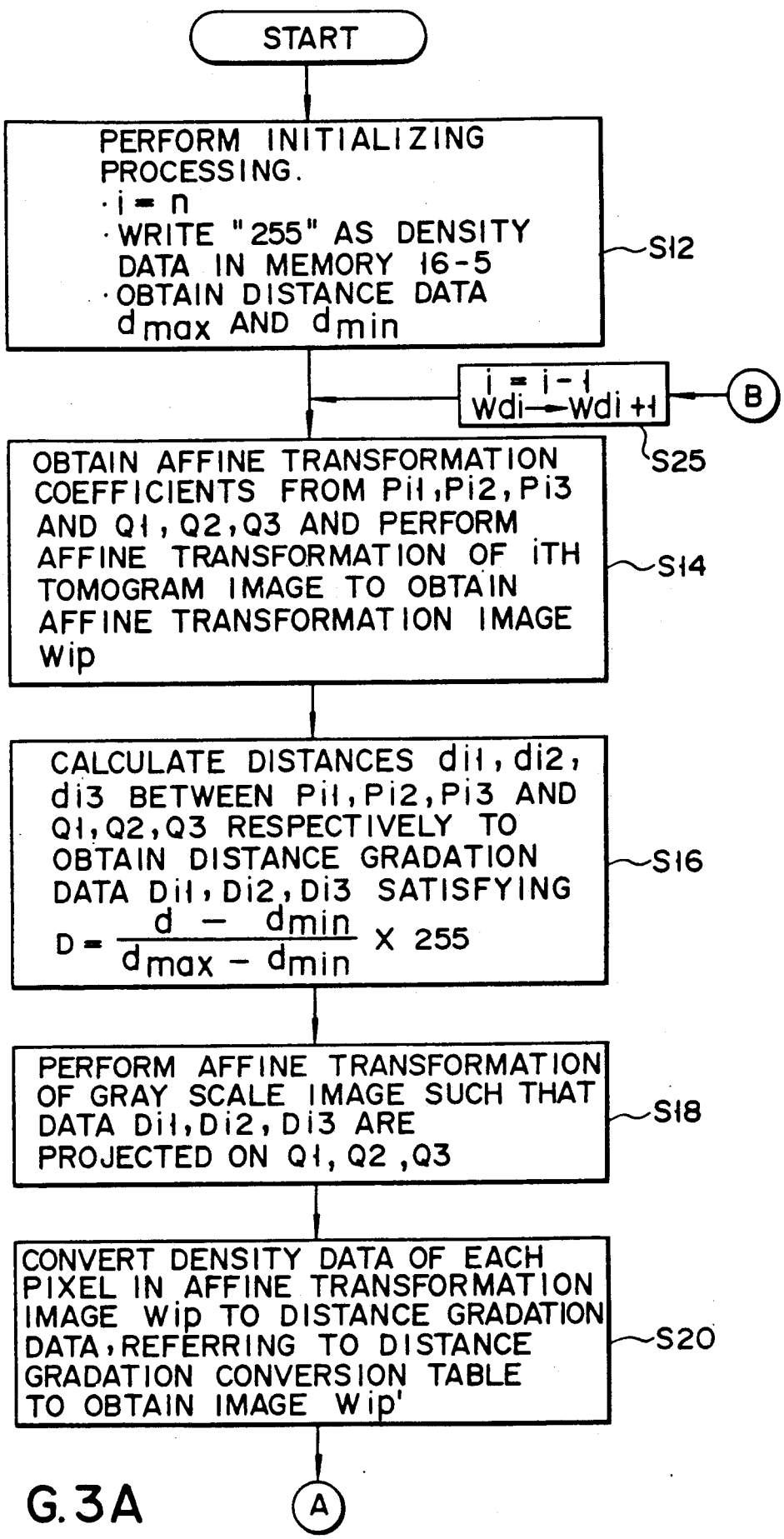
FIGS. 3A and 3B are flow charts for explaining the operation shown in FIG. 2 in detail.

An operation of the image processing apparatus in FIG. 1 will be described with reference to flow charts shown in FIG. 2, and FIGS. 3A and 3B.

An overall operation will be described first with reference to FIG. 2. Assume that a series of two-dimensional tomogram images of an object are stored in frame memories 15-1 to 15-n.

In step S2, distance image Wd is obtained from a series of tomogram images Wi (i=1 to n). Distance image Wd has 8-bit gradation data as density data of each pixel. Each 8-bit gradation data represents a distance from a pixel in a projection image on given plane Q to a portion (corresponding to the pixel) on the object. In step S4, normal image Wn is obtained from distance image Wd. Normal image Wn has components of a normal vector in a portion (corresponding to a pixel in the distance image) on the object as density data. In step S6, a shading image is obtained from the normal image when the object is viewed from an arbitrary direction.

The operation shown in steps S2 to S6 will be described in detail with reference to FIGS. 3A and 3B.

Assume that a series of n two-dimensional binary tomogram images W1 to Wn are stored in frame memories 15-1 to 15-n. Each pixel in each tomogram image has 8-bit density data.

Figure 5:
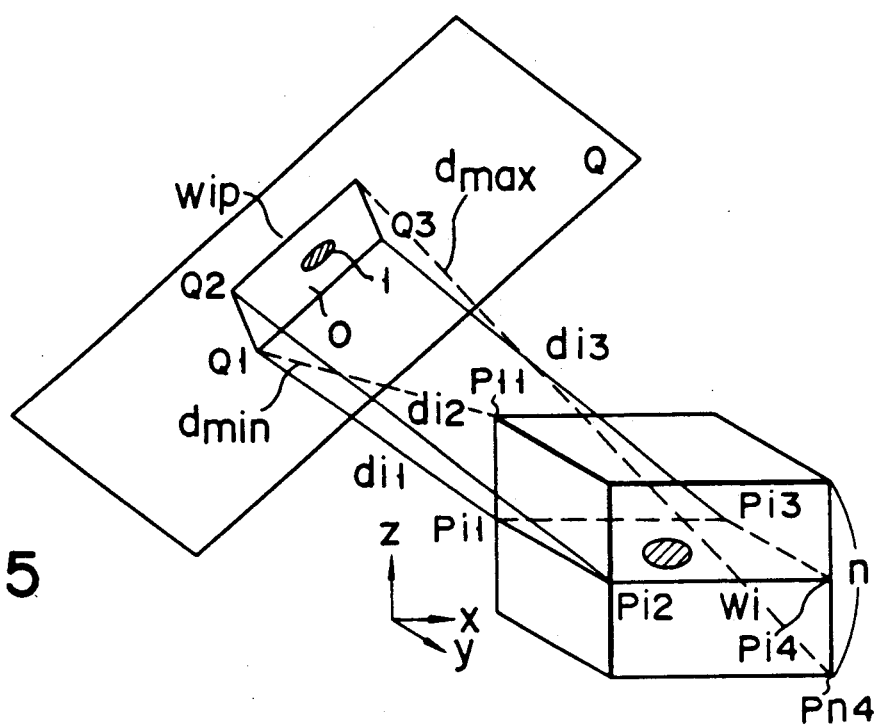
FIG. 5 is a view for explaining affine transformation of a tomogram image of an object on an arbitrarily designated projection plane.
Figure 6:
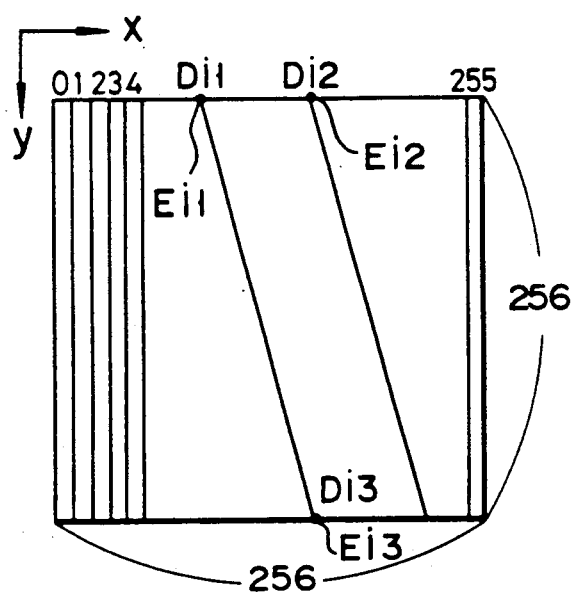
FIG. 6 is a view showing an affine transformation image corresponding to density data of a gray scale image.

In step S12, initialization is executed, and variable i is set to n. This means that tomogram images are sequentially processed from a tomogram image which is located farthest from given projection plane Q. CPU 11 outputs an initialization instruction to processor 24. In response to the initialization instruction, density data "255" for all the pixels are written in frame memory 16-5. Referring to FIG. 5, distance $d_{max}$ from farthest pixel $P_{n4}$ of the tomogram image, which is located farthest from the projection image, i.e., tomogram image Wn in this case, to corresponding pixel $Q_4$ of the projection image, and distance $d_{min}$ from nearest pixel $P_{11}$ of tomogram image W1 which is located nearest to the projection image to corresponding pixel $Q_1$ of the projection image, are obtained.

In step S14, an affine transformation image which is a projection image onto given plane Q of an ith ($1 \leq i \leq n$) tomogram image is obtained. Note that processing in step S14 is the same for all the tomogram images. More specifically, CPU 11 outputs an affine transformation coefficient operation instruction to processor 24. In response to this instruction, three arbitrary points which are not aligned on the same line on ith tomogram image Wi, e.g., three points $P_{i1}$, $P_{i2}$, and $P_{i3}$ of the four vertexes of tomogram image Wi as shown in FIG. 5, are selected, and points $Q_1$, $Q_2$, and $Q_3$ on given projection plane Q are designated. Processor 24 determines known affine transformation coefficients from a relationship between three points $P_{i1}$ to $P_{i3}$ on tomogram image Wi and three points $Q_1$ to $Q_3$ on the projection image of tomogram image Wi, i.e., affine transformation image Wip. Processor 24 signals the end of the calculation of affine transformation coefficients to CPU 11.

Figure 4A:
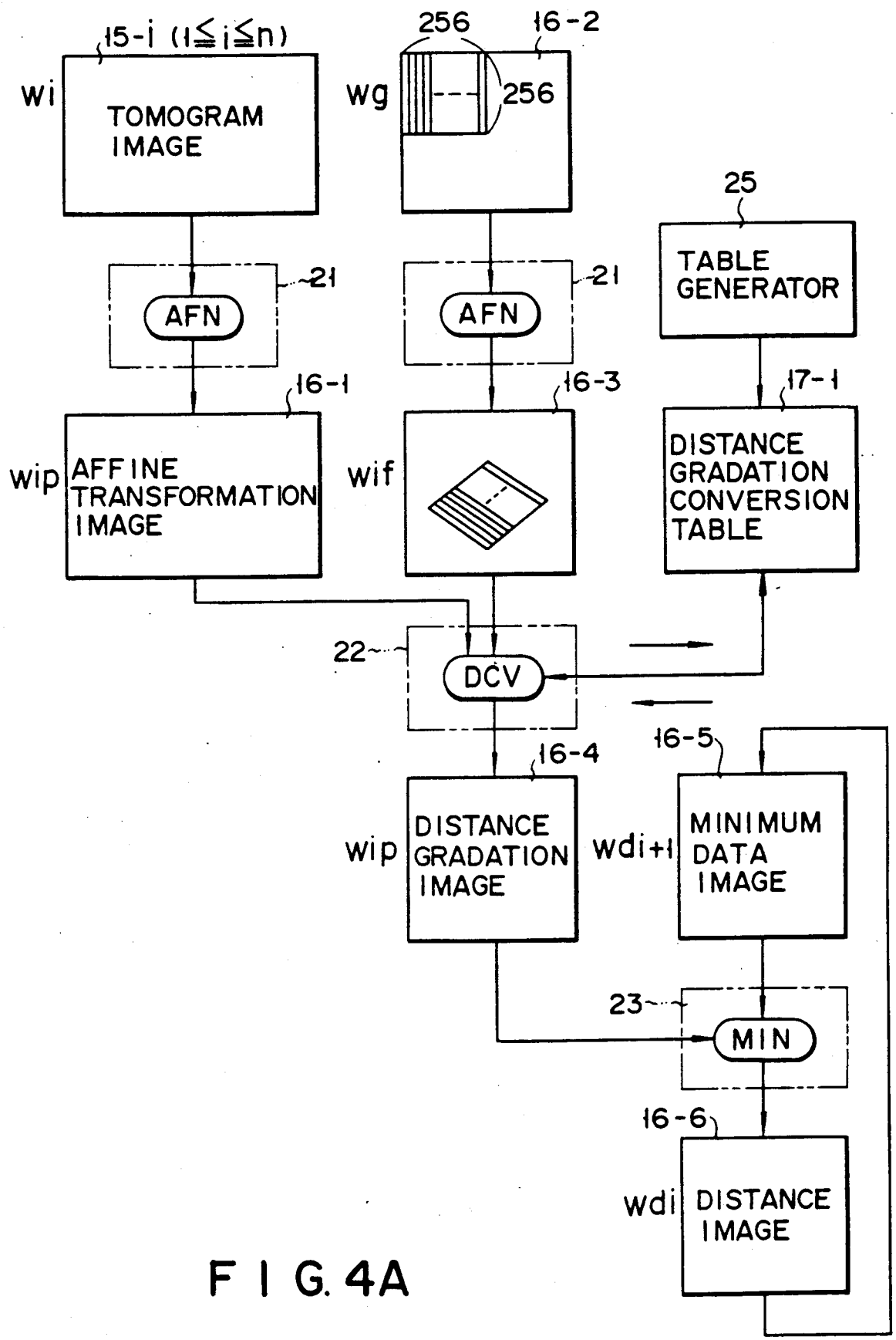

In response to the acknowledgement of the end of the calculation from processor 24, CPU 11 outputs an affine transformation instruction using the calculated coefficients to AFN processor 21 through control bus 28. AFN processor 21 affine-transforms binary tomogram image Wi stored in frame memory 15-i, as shown in FIG. 4A, using the calculated affine transformation coefficients to store affine transformation image Wip in frame memory 16-1. In this case, data "1" is written in each pixel in affine transformation image Wip as density data when the corresponding pixel represents the object, whereas data "0" is written in it when it does not represent the object. When affine transformation image Wip is obtained, AFN processor 21 signals the end of affine transformation to CPU 11 through control bus 28.

In step S16, CPU 11 outputs a distance gradation operation instruction to processor 24 in response to the acknowledgement from AFN processor 21. In response to the instruction, processor 24 obtains distances $d_{i1}$, $d_{i2}$, and $d_{i3}$ from three points $P_{i1}$, $P_{i2}$, and $P_{i3}$ on image Wi to corresponding points $Q_1$, $Q_2$, and $Q_3$ on the projection image, as shown in FIG. 5. Subsequently, distances $d_{i1}$, $d_{i2}$, and $d_{i3}$ are converted into 8-bit gradation data $D_{i1}$, $D_{i2}$, and $D_{i3}$ in the following manner.

Distance $d_{min}$ to the point located nearest to the projection image and distance $d_{max}$ to a point located farthest from the projection image in the two-dimensional tomogram image have been obtained in step S14. The density data of a pixel with distance d from a corresponding pixel in the projection image is determined to be gradation data D so that the density data of the pixel with distance $d_{min}$ is set to minimum value 0, i.e., the gray level of the highest luminance, and the density data of the pixel with distance $d_{max}$ is set to maximum value 255, i.e., the gray level of the lowest luminance in the tomogram image. Therefore, distance gradation data D can be obtained in accordance with the following equation:

$$D = \{(d - d_{min})/(d_{max} - d_{min})\} \times 255 \quad (1)$$

Processor 24 obtains distance gradation data $D_{i1}$, $D_{i2}$, and $D_{i3}$ regarding points $Q_1$, $Q_2$, and $Q_3$ of the projection image from previously calculated distances $d_{i1}$, $d_{i2}$, and $d_{i3}$ from points $P_{i1}$, $P_{i2}$, and $P_{i3}$ to affine transformation points $Q_1$, $Q_2$, and $Q_3$ by using equation (1). These data are used as density data. When processor 24 obtains distance gradation data $D_{i1}$, $D_{i2}$, and $D_{i3}$, it signals the end of the distance gradation operation to CPU 11.

Frame memory 16-2 stores 256×256-bit two-dimensional gray scale image Wg in correspondence with the number of pixels of the tomogram image. The density data of the respective pixels of image Wg are sequentially changed one by one from 0 to 255 in the x-direction. The density data are not changed in the y-direction. In response to the acknowledgement of the end of the distance gradation operation, CPU 11 outputs an affine transformation coefficient operation instruction to processor 24 again.

Figure 7:
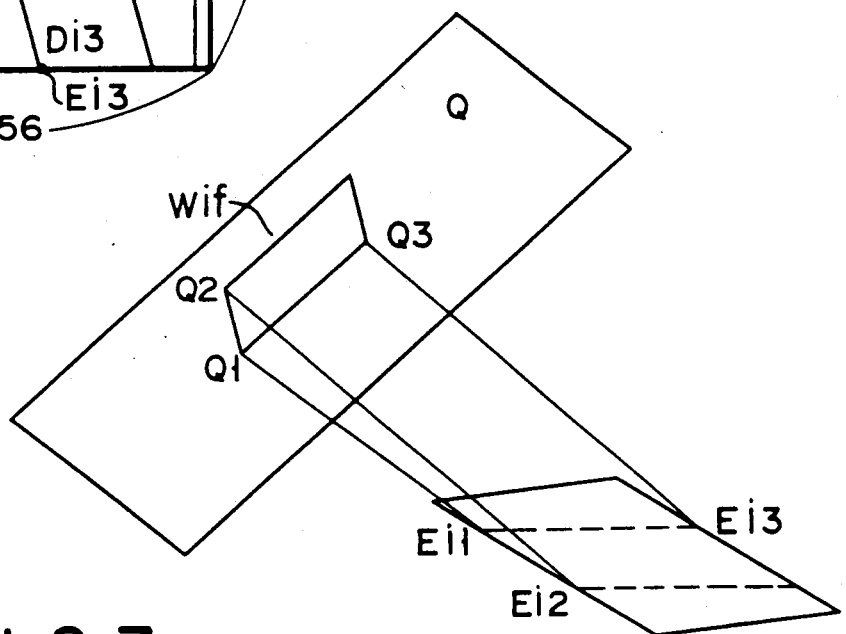
FIG. 7 is a view for explaining the affine transformation of the gray scale image on an arbitrarily designated projection plane.

In response to the affine transformation coefficient operation instruction, processor 24 obtains points $E_{i1}$ and $E_{i2}$ having density data $D_{i1}$ and $D_{i2}$ on the upper side of gray scale image Wg, and point $E_{i3}$ having density data $D_{i3}$ on the lower side of image Wg. Then, affine transformation coefficients for affine-transforming three points $E_{i1}$, $E_{i2}$, and $E_{i3}$ shown in FIG. 7 into three points $Q_1$, $Q_2$, and $Q_3$ on the projection image in FIG. 5 are obtained. When the affine transformation coefficients are obtained, processor 24 signals the end of the affine transformation coefficient operation to CPU 11.

In step S18, CPU 11 outputs an instruction for affine-transforming gray scale image Wg using the calculated affine transformation coefficients to AFN processor 21 through control bus 28 in response to the acknowledgement of the end of the affine transformation coefficient operation. In response to the affine transformation instruction, AFN processor 21 affine-transforms a gray scale image in an area defined by points $E_{i1}$, $E_{i2}$, and $E_{i3}$ of gray scale image Wg stored in frame memory 16-2 by using the affine transformation coefficients supplied from CPU 11, and stores affine transformation image Wif in frame memory 16-3. When affine transformation processing is completed, AFN processor 21 signals the end of affine transformation to CPU 11 through control bus 28.

In step S20, CPU 11 outputs a distance gradation conversion table generation instruction to table generator 25 in response to the acknowledgement of the end of the affine transformation from AFN processor 21. In response to the generation instruction, generator 25 outputs distance gradation conversion table 17-1 and stores it in table memory 17. When generation of distance gradation conversion table 17-1 is completed, CPU 11 outputs a distance gradation data conversion instruction to DCV processor 22.

Figures 8, 9, 10, 11:
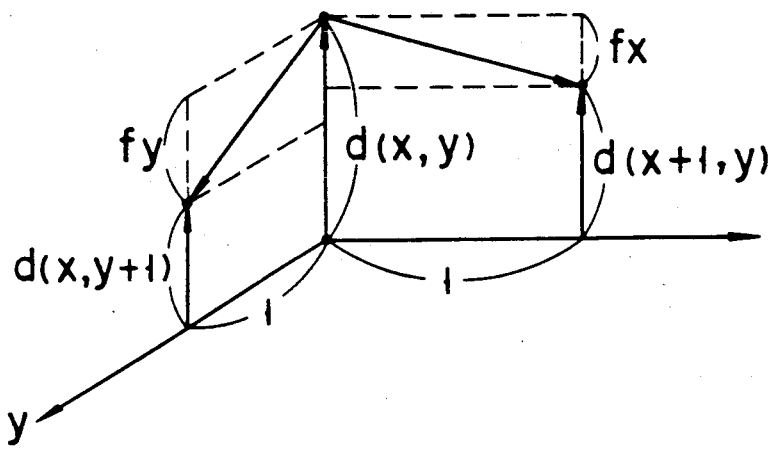
FIG. 8 is a view showing a distance gradation conversion table set in a table memory in FIG. 1.
FIG. 9 is a view for explaining x- and y-direction differential data of an arbitrary pixel in a distance image.
FIG. 10 is a view showing x-direction differential conversion table used for obtaining an x-direction differential image.
FIG. 11 is a y-direction differential conversion table used for obtaining a y-direction differential image.

As shown in FIG. 8, distance gradation conversion table 17-1 set in table memory 17 has entries designated by 12-bit density data having upper four bits set at "0" ("0000") or "1" ("0001"). Of the entries, entries which are designated by the upper four bits set at "0" store 8-bit data equivalent to 255 as density data, whereas entries designated by the upper four bits set at "1" store 8-bit data equivalent to the values (0 to 255) of the lower eight bits as density data. Note that the above conversion table may be set in table memory 17 in advance.

In response to the distance gradation data conversion instruction from CPU 11, DCV processor 22 sets the lower four bits of the 8-bit density data of each pixel in image Wip stored in frame memory 16-1 to be the upper four bits of an entry address. In addition, DCV processor 22 sets the 8-bit density data of the corresponding pixel in image Wif stored in frame memory 16-3 to be the lower eight bits of the entry address. In this manner, a 12-bit entry address is generated.

In this case, data "1" is written as density data of each pixel in image Wip when the object is present in step S14, whereas data "0" is written when the object is not present. Data $D_{i1}$, $D_{i2}$, and $D_{i3}$ are distance gradation data obtained by converting distances from pixels $P_{i1}$, $P_{i2}$, and $P_{i3}$ of image Wi to corresponding pixels $Q_1$, $Q_2$, and $Q_3$ of projection image Wip into gradation. Therefore, image Wif represents distance gradation data of each pixel in image Wi.

In accordance with the generated entry address, DCV processor 22 converts the 8-bit density data of each pixel in image Wip into distance gradation data by referring to distance gradation conversion table 17-1 in table memory 17. The converted density data is written in frame memory 16-4 as the density data of a corresponding pixel in distance gradation image Wip'. As is apparent from distance gradation conversion table 17-1 shown in FIG. 8, the converted density data becomes maximum density data "255", i.e., the gray level of the lowest luminance, when the density data of affine transformation image Wip is 0, and becomes equal to the density data of image Wif when the density data of image Wip is 1. Therefore, if DCV processor 22 repeats the above processing with respect to all the pixels of images Wip and Wif, distance gradation image Wip' corresponding to ith binary tomogram image Wi can be obtained in frame memory 16-4. When the data conversion processing is completed, DCV processor 22 signals the end of the data conversion to CPU 11 through control bus 24.

Figure 3B:
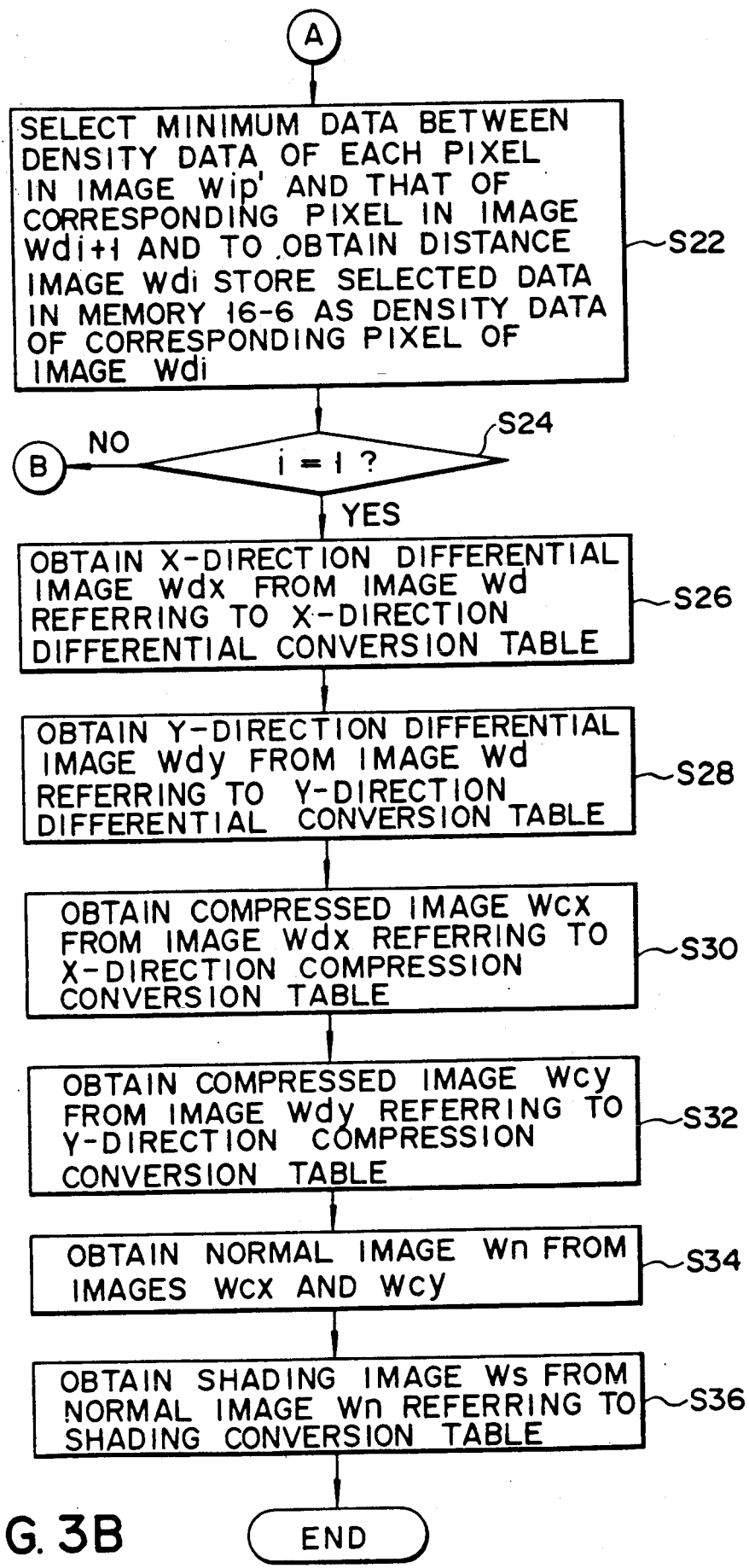

In FIG. 3B, in step S22, CPU 11 outputs a minimum value operation instruction for obtaining distance image Wd to MIN processor 23 in response to the acknowledgement of the end of the data conversion from DCV processor 22. In response to the minimum value operation instruction, MIN processor 23 obtains the minimum value between the density data of each pixel in image Wip' stored in frame memory 16-4 and the minimum data image of binary tomogram images Wn to Wi+1 stored in frame memory 16-5, i.e., the density data of a corresponding pixel in distance image Wdi+1, and writes the obtained density data in frame memory 16-6 as the density data of a corresponding pixel in distance image Wd. By executing this minimum value operation processing with respect to all the pixels in images Wip' and Wdi+1, distance images Wd corresponding to tomogram images from the initial tomogram image to ith binary tomogram image Wi can be obtained in frame memory 16-6.

The above description equally applies to image Wip' satisfying i≦n −1. When the initial image, i.e., nth image Wnp' is to be subjected to minimum value operation processing, since data "255" is written as the density data of each pixel in image Wdi+1 stored in frame memory 16-5 in step S12, the density data of each pixel in image Wnp' is compared with density data "255" of a corresponding pixel in image Wdi+1.

By executing the minimum value operation processing in step S22 for all tomogram images Wi to Wn, a pixel having a gray level corresponding to the highest luminance among the pixels of tomogram images Wi to Wn at all the pixel positions is selected. Since the density data of the selected pixel is gradation data and is associated with a distance as obtained in step S16, image Wd stored in frame memory 16-6 is a distance image, each pixel of which has a distance from projection plane Q to the object as the density data.

When distance image Wd is obtained in frame memory 16-6, MIN processor 23 signals the end of the minimum value operation to CPU 11. In response to the acknowledgement of the end of the operation, CPU 11 checks whether i is equal to one in step S24. If Y in step S24, step S26 is executed. If N in step S24, step S25 is executed. In step S25, i is decremented by one, and the image data is transferred from frame memory 16-6 to frame memory 16-5. With this operation, image Wd obtained in step S22 is set as new image Wdi+1 in place of the previous image. Subsequently, processing in steps S14 to S22 is repeated.

In this manner, the processing in steps S14 to S22 is repeatedly executed for the binary tomogram images stored in frame memories 15-1 to 15-n sequentially from the tomogram image located farthest from given projection plane Q so that distance image Wd of a three-dimensional binary image when viewed from an arbitrary direction can be obtained. As a result, a shading image of the three-dimensional binary image when viewed from an arbitrary direction can be obtained using finally obtained distance image Wd.

Note that in the above processing, frame memories 16-5 and 16-6 are respectively used for storing images Wdi+1 and Wd. However, they can be alternately switched. In this case, image transfer from frame memory 16-6 to frame memory 16-5 is not necessary. In addition, in the embodiment, the binary tomogram images are respectively stored in different frame memories. However, the present invention is not limited to this arrangement. For example, if a frame memory having an 8-bit depth is employed, in order to effectively use it, eight continuous tomogram images may be stored in this single frame memory. Furthermore, the tomogram images are sequentially processed from the tomogram image located farthest from given projection plane Q. The present invention is not limited to this. For example, they may be sequentially processed from the tomogram image located nearest to plane Q. In this case, the same processing can be applied.

In order to obtain normal image Wn from distance image Wd stored in frame memory 16-6, x- and y-direction differential images Wdx and Wdy are obtained first from distance image Wd in the following manner. Each pixel in x- and y-direction differential images Wdx and Wdy has signed 8-bit differential data as density data, which represents a difference in density data between each pixel in distance image Wd and pixels adjacent thereto in the x- and y-directions. As is apparent from FIG. 9, if the density data of arbitrary pixel p(x,y) is d(x,y), and the density data of x- and y-direction adjacent pixels px(x+1,y) and py(x,y+1) of pixel P(x,y) are d(x+1,y) and d(x,y+1), respectively, x- and y-direction differential data fx and fy of pixel p(x,y) can be given by the following equations:

$$fx = d(x+1,y) - d(x,y) \qquad (2)$$

$$fy = d(x,y+1) - d(x,y) \qquad (3)$$

In this case, a 3×3-bit spatial filtering table (hereinafter referred to as an x-direction differential conversion table) shown in FIG. 10 is used to obtain x-direction differential data fx, whereas a 3×3-bit spatial filtering table (hereinafter referred to as a y-direction differential conversion table) shown in FIG. 11 is used to obtain y-direction differential data fy.

When distance image Wd is obtained in step S26, CPU 11 outputs an x-direction differential conversion table generation instruction to table generator 25 in step S26. In response to this instruction, generator 25 generates 3×3-bit x-direction differential conversion table 17-2 shown in FIG. 10 and writes it in table memory 17 through control bus 28. When the table is written, CPU 11 outputs an x-direction differential instruction to DCV processor 22. DCV processor 22 performs spatial filtering of distance image Wd stored in frame memory 16-6 by using 3×3-bit x-direction differential table 17-2 set in table memory 17. That is, DCV processor 22 obtains a difference in density data between each pixel in distance image Wd and a pixel adjacent thereto in the x-direction as signed 8-bit differential data, and stores it in frame memory 16-7 as the density data of a corresponding pixel. With this operation, x-direction differential image Wdx with respect to distance image Wd can be obtained in frame memory 16-7. When DCV processor 22 obtains x-direction differential image Wdx in frame memory 16-7, it signals the end of the x-direction differential processing to CPU 11.

In step S28, in response to the acknowledgement of the end of the processing from DCV processor 22, CPU 11 outputs a y-direction differential conversion table generation instruction to table generator 25 through control bus 28 so as to set 3×3-bit y-direction differential conversion table 17-4 shown in FIG. 11 in table memory 17. When y-direction differential conversion table 17-4 is written, CPU 11 outputs a y-direction differential instruction to DCV processor 22.

In response to the y-direction differential instruction from CPU 11, DCV processor 22 performs spatial filtering of distance image Wd stored in frame memory 16-6 by using 3×3-bit y-direction differential conversion table 17-4 set in table memory 17 in the same manner as in the x-direction differential processing. With this operation, a difference in density data between each pixel in distance image Wd and a pixel adjacent thereto in the y-direction is obtained as signed 8-bit differential data and is stored in frame memory 16-9 as the density data of a corresponding pixel. As a result, y-direction differential image Wdy with respect to distance image Wd can be obtained in frame memory 16-9. When the y-direction differential image is obtained in frame memory 16-9, DCV processor 22 outputs the end of the y-direction differential processing to CPU 11.

Figures 12A, 12B, 12C:
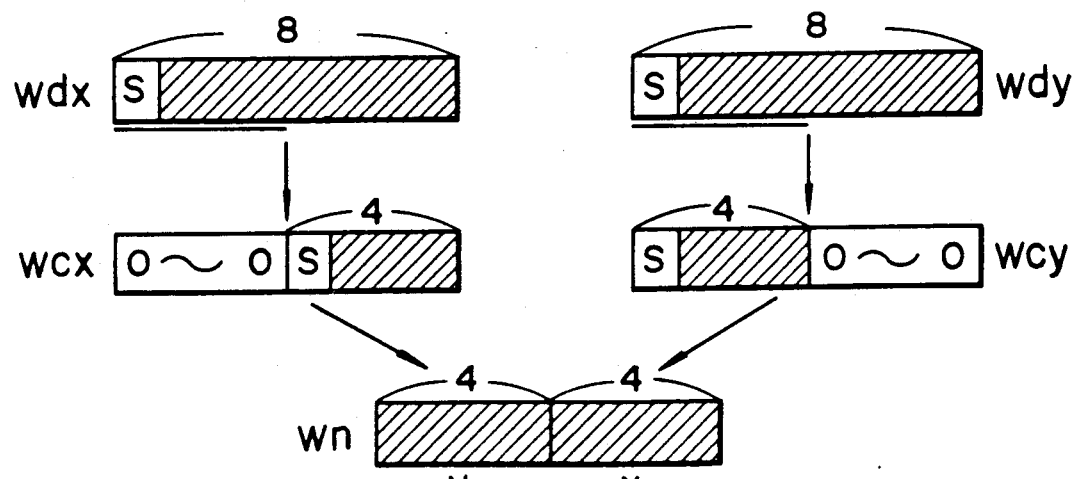
FIG. 12A is a view showing an x-direction compression conversion table used for obtaining an x-direction compressed image.
FIG. 12B is a view showing a y-direction compression conversion table used for obtaining a y-direction compressed image.
FIG. 12C is a view showing a relationship between density data of x- and y-direction differential images, density data of x- and y-direction compressed images, and density data of a normal image.

In step S30, in response to the acknowledgement of the end of the processing from DCV processor 22, CPU 11 outputs an x-direction compression conversion table generation instruction to table generator 25. In response to this instruction, generator 25 generates x-direction compression conversion table 17-3 shown in FIG. 12A and writes it in table memory 17 through control bus 18. As shown in FIG. 12A, conversion table 17-3 includes 256 entries each of which has conversion data obtained by shifting an 8-bit address in the LSB direction by four bits and setting the upper four bits to "0". When the table is written, CPU 11 outputs an x-direction compression instruction for x-direction differential image Wdx stored in frame memory 16-7 to DCV processor 22.

In response to this data conversion instruction, DCV processor 22 converts the signed 8-bit density data (x-direction differential data) of each pixel in x-direction differential image Wdx stored in frame memory 16-7 into new 8-bit compressed data, in which the upper four bits of the above data are set as the lower four bits and all the upper four bits are set to "0", by referring to x-direction compression conversion table 17-3. The converted compressed data is stored in frame memory 16-8 as the density data of a corresponding pixel. As a result, new x-direction compressed image Wcx obtained by compressing the density data of each pixel in x-direction differential image Wdx into 4-bit data is obtained in frame memory 16-8. When the x-direction compression processing is completed, DCV processor 22 signals the end of the x-direction compression processing to CPU 11.

In step S32, in response to the acknowledgement from DCV 22, CPU 11 outputs a y-direction compression conversion table generation instruction to table generator 25. In response to this instruction, generator 25 generates y-direction compression conversion table 17-5 shown in FIG. 12B and writes it in table memory 17 through control bus 28. As shown in FIG. 12B, y-direction compression conversion table 17-5 includes 256 entries each of which has conversion data obtained by setting the lower four bits of an 8-bit entry address at "0" without changing its upper four bits. When the table is written, CPU 11 outputs a y-direction compression instruction for y-direction differential image Wdy stored in frame memory 16-9 to DCV processor 22.

In response to the y-direction compression instruction, DCV processor 22 converts the signed 8-bit density data (y-direction differential data) of each pixel in y-direction differential image Wdy stored in frame memory 16-9 into new 8-bit density data, in which the upper four bits of the above data are set as the upper four bits and all the lower four bits are set to "0", by referring to y-direction compression conversion table 17-5. The converted compressed density data is stored in frame memory 16-10 as the density data of a corresponding pixel. As a result, new y-direction compressed image Wcy obtained by compressing the density data of each pixel in the y-direction differential image into 4-bit data can be obtained in frame memory 16-10. When the y-direction compression processing is completed, DCV processor 22 signals the end of the y-direction compression processing to CPU 11.

In step S34, in response to the acknowledgement from DCV processor 22, CPU 11 outputs a logical operation instruction to processor 24.

In response to the logical operation instruction, processor 24 calculates the OR of the 8-bit density data of each pixel in x-direction compressed image Wcx stored in frame memory 16-8 and that of a corresponding pixel in y-direction compressed image Wcy stored in frame memory 16-10, and stores the OR result, i.e., the 8-bit density data obtained from the lower four bits of the effective portion of each pixel in the x-direction compressed image and the upper four bits of the effective portion of each pixel in the y-direction compressed image, in frame memory 16-11 as the density data of a corresponding pixel. As a result, new image (hereinafter referred to as a normal image) Wn is obtained in frame memory 16-22.

FIG. 12C shows a relationship between the density data of x- and y-direction differential images Wdx and Wdy, the density data of x- and y-direction compressed images Wcx and Wcy, and the density data of normal image Wn. Note that if processor 24 has a capacity of 12 bits, density data of x- and y-direction differential images are only required to be compressed into 6-bit data and be coupled to each other. In this case, high-precision processing can be realized as compared with the case wherein data are compressed into 4-bit data. In addition, if processor 24 has a capacity of 16 bits, density data of x- and y-direction differential images can be directly coupled to each other and used as the density data of a normal image.

A normal image having 8-bit density data including the lower and upper four bits of x- and y-direction compressed images will be described below with reference to FIG. 13. Referring to FIG. 13, vector $\vec{V}$ is a normal vector at point P1 on the object surface corresponding to pixel P(x,y) in distance image Wd, vector $\vec{x'}$ is a vector from point P1 toward point P2 on the object surface corresponding to x-direction adjacent pixel (x+1,Y) of point P, and vector $\vec{y'}$ is a vector from point P1 toward point P3 on the object surface corresponding to y-direction adjacent pixel (x,y+1). In this case, if an x-direction differential value at point P, i.e., x-direction differential density data, and a y-direction differential value at point P, i.e., a y-direction differential density data, are respectively set to be fx and fy, and fundamental vectors are set to be $\vec{e1}$, $\vec{e2}$, and $\vec{e3}$, normal vector $\vec{V}$ can be represented by the following equation:

$$\vec{V} = \vec{x'} \times \vec{y'} = \begin{vmatrix} 0 & fx \\ 1 & fy \end{vmatrix} \vec{e1} + \begin{vmatrix} fx & 1 \\ fy & 0 \end{vmatrix} \vec{e2} + \begin{vmatrix} 1 & 0 \\ 0 & 1 \end{vmatrix} \vec{e3}$$
$$= (-fx, -fy, 1)$$

That is, normal vector $\vec{V}$ can be represented by data fx and fy. For this reason, an image including pixels each having this density data including data fx and fy, i.e., 8-bit density data constituted by 4-bit data fx and fy in this case, is called normal image Wn.

When processor 24 obtains normal image Wn in frame memory 16-11 in accordance with the above logical operation, it signals the end of the logical operation to CPU 11.

In step S36, in response to the acknowledgement from processor 24, CPU 11 outputs a shading conversion table generation instruction to table generator 25 so as to generate a shading conversion table for obtaining shading image Ws from normal image Wn. In response to this table generation instruction, generator 25 generates shading conversion table 17-6 and stores it in table memory 17. Shading conversion table 17-6 will be described below.

As is known, diffusion reflection of parallel light beams on a surface is proportional to the cosine of light vector $\vec{L}$ which is determined by a predetermined direction of light beams and normal vector $\vec{V}$ of the surface. Therefore, as shown in FIG. 14, when an angle defined by vectors $\vec{L}$ and $\vec{V}$ is represented by $\theta$, brightness (luminance) B of the surface can be represented by the following equations:

$$B = k \cdot \cos(\pi - \theta) + \alpha$$
$$= -k \cdot \cos\theta + \alpha$$
$$= -k\{(\vec{L} \cdot \vec{V})/|\vec{L}| \cdot |\vec{V}|\} + \alpha$$

where k and $\alpha$ are constants.
If $$\vec{L} = (lx, ly, lz) \text{ and } \vec{V} = (-fx, -fy, 1)$$

then, $$B = -k\{(-fx \cdot lx - fy \cdot ly + lz)/(\sqrt{lx^2 + ly^2 + lz^2} \times \sqrt{fx^2 + fy^2 + 1})\} + \alpha$$

If in this case, $$b = (fx \cdot lx + fy \cdot ly - lz)/(\sqrt{lx^2 + ly^2 + lz^2} \times \sqrt{fx^2 + fy^2 + 1})$$

then B can be represented as:

$$B = k \cdot b + \alpha$$

Since K and $\alpha$ are constants, B is determined by the value of b. In this embodiment, in step S16, brightness of a surface is represented by 8-bit luminance data B. Accordingly, B=0, when b is set to minimum value $b_{min}$, i.e., becomes brightest, whereas B=255, when b is set to maximum value $b_{max}$, i.e., becomes darkest. Therefore, B can be obtained by the following equation:

$$B = (b - b_{max}) \times (255)/(b_{max} - b_{min})$$

Table generator 25 calculates values b with respect to all the combinations of 4-bit data fy and fx, i.e., 256 combinations, and then calculates value B corresponding to each value b obtained in this calculation. Shading conversion table 17-6 is generated by setting each calculated value B in a corresponding entry designated by an entry address determined by a combination of differential data fy and fx.

In response to the acknowledgement of the table generation processing from table generator 25, CPU 11 outputs a shading conversion instruction to DCV processor 22. In response to this instruction, DCV processor 22 obtains 8-bit luminance data (B) by referring to shading conversion table 17-6 which has density data including parts of differential data fy and fx of each pixel in normal image Wn stored in frame memory 16-11 as an entry address. Then, DCV processor 22 stores the obtained data in frame memory 16-12 as the density data of a corresponding pixel. That is, data conversion is performed so as to convert the density data of normal image Wn into the luminance data. As a result, a shading image is obtained in frame memory 16-12.

As is apparent from the description, a shading state can be changed by changing a direction of light beams in a real time manner such that values b are calculated by changing lx, ly, and lz, a corresponding data conversion table is generated, and data conversion is performed. In addition, it is apparent that a shading image when viewed from an arbitrary direction can be obtained by changing a direction of obtaining distance image Wd, i.e., by changing plane Q shown in FIG. 5.

Note that an x-direction differential table (spatial filtering table) for obtaining an x-direction image is not limited to the table shown in FIG. 10. For example, tables shown in FIGS. 15A and 15B may be used. Similarly, a y-direction differential table (spatial filtering table) for obtaining a y-direction differential image is not limited to the table shown in FIG. 11. For example, tables shown in FIGS. 16A and 16B may be used. In addition, in the above-described embodiment, the various types of images such as distance images, x-direction differential images, y-direction differential images, and normal images are respectively stored in different frame memories. However, the present invention is not limited to this arrangement. For example, images may be stored in unused frame memories for effective use of the frame memories.

What is claimed is:

1. An image processing apparatus comprising;
first obtaining means for obtaining from a distance image having density data representing in gradation, distances from a pre-designated area on a pre-designated plane in a space to an image of the object in the space, a normal image which has as density data parts of components of normal vectors of the object; and second obtaining means for obtaining a shading image having as density data luminance data from the normal image density data nd direction data representing the given direction, wherein said first obtaining means includes:

means for obtaining an x-direction differential image having as density data x-direction differential data obtained from the density data of the distance image consecutive in the x-direction;

means for obtaining a y-direction differential image having as density data y-direction differential data obtained from the density data of the distance image consecutive in the y-direction;

means for compressing the density data of the x-direction differential image;

means for compressing the density data of the y-direction differential image; and means for linking the x- and y-direction compressed data.

2. An image processing apparatus according to claim 1, further comprising:

distance gradation image obtaining means for obtaining a plurality of distance gradation images from a plurality of two-dimensional tomogram images, each of said plurality of distance gradation images having density data representing in the gradation, distances from a pre-designated area to said plurality of two-dimensional tomogram images, respectively; and minimum data operation means for calculating minimum data among the density data of said plurality of distance gradation images in units of pixels to obtain density data of said distance image.

3. An apparatus according to claim 2, wherein said distance gradation image obtaining means includes means for projecting said plurality of two-dimensional tomogram images on the pre-designated area to obtain a plurality of projection images, for projecting portions of a gray scale image determined in accordance with said plurality of projection images and said plurality of tomogram images, on the pre-designated area to obtain a plurality of reference gradation images, and for obtaining said plurality of distance gradation images from said plurality of projection images and said plurality of reference gradation images.

4. An apparatus according to claim 3, wherein said distance gradation image obtaining means includes:

tomogram image affine transformation means for affine-transforming said plurality of two-dimensional tomogram images into the pre-designated area to obtain said plurality of projection images; and gray scale image affine transformation means for affine-transforming the portions of said gray scale image determined in accordance with distances between said plurality of projection images and said plurality of tomogram images, into the pre-designated area to obtain said plurality of reference gradation images.

5. An apparatus according to claim 3, wherein said distance gradation image obtaining means includes distance gradation image density data obtaining means for obtaining the distance gradation data from the density data of each of said plurality of projection images in accordance with a corresponding one of said plurality of reference gradation images.

6. An apparatus according to claim 5, wherein said distance gradation image density data obtaining means comprises:

table storage means for storing a distance gradation conversion table having the distance image density data representing said second distance in gradation; and means for obtaining the distance image density data by referring to said distance gradation conversion table in accordance with the density data of each of said plurality of projection images and that of each of said plurality of reference gradation images.

7. An apparatus according to claim 6, wherein said distance gradation image density data obtaining means further comprises means for generating and storing in said table storage means the distance gradation conversion table.

8. An apparatus according to claim 1, wherein said first means includes:

table memory means for storing x- and y-direction differential conversion tables which represent the density data, consecutive in the x- and y-directions, used for obtaining x- and y-direction differential data;

means for referring to said x-direction differential conversion table in accordance with said distance image density data, and calculating x-direction differential data from the density data indicated by said x-direction differential conversion table; and means for referring to said y-direction differential conversion table in accordance with said distance image density data, and calculating y-direction differential data from the density data indicated by said y-direction differential conversion table.

9. An apparatus according to claim 1, wherein said second obtaining means comprises:

table memory means for storing a shading conversion table which stores the luminance data when the object is viewed from the given direction, regarding said normal image density data; and means for referring to said shading conversion table in accordance with said normal image density data to obtain the luminance data as the density data of said shading image.

10. An apparatus according to claim 9, wherein said second obtaining means further comprises table generating means for generating said shading conversion table in accordance with the direction data and the normal image density data, and storing said shading conversion table in said table memory means.

11. An apparatus according to claim 1, wherein said first obtaining means further includes:

third obtaining means for obtaining said normal image having as the density data linked data of portions of the density data of the obtained x- and y-direction differential images.

12. An image processing method, comprising;

obtaining from a distance image a normal image having as density data parts of components of normal vectors of the object; and obtaining a shading image having as density data luminance data from the normal image density data and direction data representing a given direction from which the object is viewed, wherein said step of obtaining the normal image includes:

obtaining an x-direction differential image having as density data x-direction differential data obtained from the density data of the distance image;

obtaining a y-direction differential image having as density data y-direction differential data obtained from the density data of the distance image;

comprising the density data of the x-direction differential image;

compressing the density data of the y-direction differential image; and linking the x- and y-direction compressed data.

13. An image processing method according to claim 12, further comprising:

obtaining a plurality of distance gradation images from said plurality of two-dimensional tomogram images, each of said plurality of distances gradation images having density data representing in gradation, distances from a pre-designated area to said plurality of two-dimensional tomogram images, respectively; and calculating minimum data among the density data of said plurality of distance gradation images in units of pixels to obtain the density data of said distance image.

14. A method according to claim 13, wherein said obtaining of said plurality of distance gradation images includes projecting said plurality of two-dimensional tomogram images on the pre-designated area to obtain a plurality of projection images, projecting portions of a gray scale image determined in accordance with said plurality of projection images and said plurality of tomogram images, on the pre-designated area to obtain a plurality of reference gradation images and obtaining said plurality of distance gradation images from said plurality of projection images and said plurality of reference gradation images.

15. A method according to claim 14, wherein said step of obtaining said plurality of distance gradation images includes:

affine-transforming said plurality of two-dimensional tomogram images into the pre-designated area to obtain said plurality of projection images; and affine-transforming the portions of said gray scale image determined in accordance with the distances between said plurality of projection images and said plurality of tomogram images, into the pre-designated area to obtain said plurality of reference gradation images.

16. A method according to claim 14, wherein said obtaining of said plurality of distance gradation images includes converting the density data of each of said plurality of projection images to the distance gradation data in accordance with the corresponding one of said plurality of reference gradation images.

17. A method according to claim 12, wherein said obtaining of the shading image comprises:

storing a shading conversion table which has the luminance data when the object is viewed from the given direction, regarding the density data of the normal image; and referring to said shading conversion table the density data of the normal image to obtain the luminance data as the density data of said shading image.

18. A method according to claim 17, further comprising:

generating the shading conversion table in accordance with the direction data.

19. A method according to claim 12, wherein said step of obtaining the normal image further includes:

obtaining said normal image having as the density data linked data of portions of the density data of the obtained x- and y-direction differential images.

20. An image processing apparatus for obtaining from a distance image a shading image when an object is viewed from a given direction, said distance image having density data representing in gradation, distances from a pre-designated area on a pre-designated plane in a space to an image of the object in the space, said apparatus comprising;

first obtaining means for obtaining from said distance image a normal image which has as density data parts of components of normal vectors of the object; and second obtaining means for obtaining said shading image having as density data luminance data from the normal image density data and direction data representing the given direction, wherein said first obtaining means includes:

means for obtaining an x-direction differential image having as density data x-direction differential data obtained form the density data of the distance image consecutive in the x-direction;

means for obtaining a y-direction differential image having as density data y-direction differential data obtained from the density data of the distance image consecutive in the y-direction;

third obtaining means for obtaining said normal image having as the density data linked data of portions of the density data of the obtained x- and y-direction differential images, means for compressing the density data of the x-direction differential image;

means for compressing the density data of the y-direction differential image; and means for linking the x- and y-direction compressed data.

21. A image processing method for obtaining from a distance image a shading image when an object is viewed from a given direction, said distance image having density data representing in gradation, distances form a pre-designated area on a pre-designated plane in a space to an image of the object in the space, comprising:

obtaining from said distance image a normal image which has as density data parts of components of normal vectors of the object; and obtaining said shading image having as density data luminance data from the normal image density data and direction data representing the given direction, wherein said step of obtaining the normal image includes:

obtaining an x-direction differential image having as density data x-direction differential data obtained from the density data of the distance image consecutive in the x-direction;

obtaining a y-direction differential image having as density data y-direction differential data obtained from the density data of the distance image consecutive in the y-direction;

obtaining said normal image having as the density data linked data of portions of the density data of the obtained x- and y-direction differential images;

compressing the density data of the x-direction differential image;

compressing the density data of the y-direction differential image; and linking the x- and y-direction compressed data.

* * * * *

UNITED STATES PATENT AND TRADEMARK OFFICE
CERTIFICATE OF CORRECTION

PATENT NO. : 5,046,108

DATED : September 03, 1991

INVENTOR(S) : Yoichi INOUE et al.

It is certified that error appears in the above-identified patent and that said Letters Patent is hereby corrected as shown below:

On the title page, Item [54],
    and Col. 1, line 1 change "IMAGING" to --IMAGE--.

Abstract, line 11, change "gradiation" to --gradation--.

Claim 1, column 12, line 63, change ";" to --:--.

Claim 1, column 13, line 5, change "nd" to --and--.

Claim 6, column 14, line 6, after "second" change "distance" to --distances--.

Claim 12, column 14, line 59, change ";" to --:--.

Claim 12, column 15, line 7, change "comprising" to --compressing--.

Claim 13, column 15, line 16, change "distances" to --distance--.

Claim 16, column 15, line 52, after "with" change "the" to --a--.

Claim 20, column 16, line 10, change ";" to --:--.

Claim 20, column 16, line 22, change "form" to --from--.

Claim 21, column 16, line 37, change "A" to --An--.

UNITED STATES PATENT AND TRADEMARK OFFICE
CERTIFICATE OF CORRECTION

PATENT NO. : 5,046,108

DATED : September 03, 1991

INVENTOR(S) : Yoichi Inoue, et al

It is certified that error appears in the above-identified patent and that said Letters Patent is hereby corrected as shown below:

Claim 21, Col. 16, line 41, change "form" to --from--.

Signed and Sealed this

Twenty-seventh Day of April, 1993

Attest:

MICHAEL K. KIRK

*Attesting Officer*  *Acting Commissioner of Patents and Trademarks*